(12) United States Patent
Kagami et al.

(10) Patent No.: US 8,766,503 B2
(45) Date of Patent: Jul. 1, 2014

(54) PERMANENT MAGNET EMBEDDED ROTOR FOR ROTATING ELECTRIC MACHINE AND ROTATING ELECTRIC MACHINE

(75) Inventors: Masanao Kagami, Kariya (JP); Ryo Umeyama, Kariya (JP); Yoshiyuki Nakane, Kariya (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 58 days.

(21) Appl. No.: 13/430,271

(22) Filed: Mar. 26, 2012

(65) Prior Publication Data

US 2012/0248915 A1    Oct. 4, 2012

(30) Foreign Application Priority Data

Mar. 28, 2011   (JP) .................................. 2011-070377

(51) Int. Cl.
*H02K 21/12*    (2006.01)
(52) U.S. Cl.
USPC ............ 310/156.53; 310/156.56; 310/156.57; 310/216.092; 310/216.093; 310/216.096
(58) Field of Classification Search
CPC .... H02K 1/276; H02K 1/2766; H02K 1/2773
USPC ........... 310/156.53, 156.57, 156.56, 216.092, 310/216.093, 216.096
See application file for complete search history.

(56) References Cited

U.S. PATENT DOCUMENTS

| 6,034,458 | A  | * | 3/2000 | Uetake et al. | ............ | 310/156.49 |
| 6,208,054 | B1 | * | 3/2001 | Tajima et al. | ............ | 310/156.53 |
| 7,560,842 | B2 |   | 7/2009 | Hattori       |              |            |
| 2003/0107290 | A1 | * | 6/2003 | De Filippis | ................ | 310/216 |
| 2007/0018522 | A1 | * | 1/2007 | Ackva et al. | ............ | 310/156.46 |

FOREIGN PATENT DOCUMENTS

| JP | 2001-016809 A | 1/2001 |
| JP | 2002-369425 A | 12/2002 |
| JP | 2004-104962 A | 4/2004 |
| JP | 2007-288838 A | 11/2007 |
| JP | 2008-148391 A | 6/2008 |
| JP | 2008-211934 A | 9/2008 |
| JP | 2010-193660 A | 9/2010 |
| JP | 2011-004480 A | 1/2011 |
| JP | 2011-062059 A | 3/2011 |

OTHER PUBLICATIONS

Chinese Office Action dated Jan. 6, 2014 issued in corresponding Chinese Patent Application No. 201210080728.0.

* cited by examiner

*Primary Examiner* — Terrance Kenerly
(74) *Attorney, Agent, or Firm* — Sughrue Mion, PLLC

(57) ABSTRACT

An accommodating recess (21A, 21B) has a magnet accommodating portion (19A, 19B) for accommodating a permanent magnet (17A, 17B) and a cavity (20A, 20B), which is located at the q-axis side of the magnet accommodating portion. The cavity opens through a rotor outer circumferential surface (162). A starting point (Pa1, Pb1) of an outer cavity forming surface (201A, 201B) is located on the rotor outer circumferential surface. The outer cavity forming surface intersects either a magnetic pole surface or an imaginary extended plane (23A, 23B) of a magnetic pole facing surface (191A, 191B). The rotor outer circumferential surface (162) includes portions of an imaginary annular line (E). A starting point (Pa1, Pb1) of the outer cavity forming surface (201A, 201B) is located between the d-axis and an intersection point (Qa, Qb) between the imaginary annular line and the imaginary extended plan of the magnetic pole facing surface.

10 Claims, 9 Drawing Sheets

PERMANENT MAGNET EMBEDDED ROTOR FOR ROTATING ELECTRIC MACHINE AND ROTATING ELECTRIC MACHINE

BACKGROUND

The present invention relates to a permanent magnet embedded rotor for a rotating electric machine and a rotating electric machine.

A rotor core for a permanent magnet embedded rotor includes a plurality of embedded permanent magnets. The permanent magnets form a plurality of magnetic poles. Each adjacent pair of the magnetic poles is different from one another as disclosed in FIG. 1 of Japanese Laid-Open Patent Publication No. 2008-211934. Thus, the magnetic fluxes are likely to be short-circuited between the ends of each adjacent pair of the permanent magnets. As more short-circuited magnetic fluxes occur, less torque is produced.

A rotor core disclosed in FIGS. 11 and 12 of Japanese Laid-Open Patent Publication No. 2004-104962 has cavities each serving as a flux barrier. The flux barriers are each adjacent to the end of a permanent magnet and open through a rotor outer circumferential surface serving as the outer circumferential surface of a rotor core. This reduces short-circuited magnetic flux between adjacent permanent magnet ends.

As described by Japanese Laid-Open Patent Publication No. 2004-104962, an adjacent pair of permanent magnets of symmetrical polarity arrangements has the magnets arranged in a V shape. The V shape increases a core zone between the permanent magnets of symmetrical polarity arrangements and the rotor outer circumferential surface. This increases magnet torque. The two adjacent permanent magnets of symmetrical polarity arrangements are accommodated in two corresponding magnet insertion recesses, or, in other words, magnet accommodating portions. The magnet inserting recesses are shaped in correspondence with each permanent magnet, which has a flat plate-like shape. The flux barrier, which is a cavity, is a space extending longitudinally from each magnet insertion recess.

However, in the above configuration, in which each pair of the permanent magnets are arranged in the V shape, the aforementioned core zone is supported only by a bridge portion as a core portion between the magnet insertion recesses. When the rotor core rotates, the centrifugal force acting in the core zone is applied to the bridge portion as load. As a result, if the core zone is large, the centrifugal load on the bridge portion may become excessively high.

Accordingly, it is an objective of the present invention to decrease centrifugal load acting on a bridge portion between each pair of adjacent permanent magnets having symmetrical polarity arrangements.

SUMMARY

In accordance with one aspect of the present invention, a permanent magnet embedded rotor for a rotating electric machine is provided. The rotor includes a rotor core and a pair of permanent magnets. The rotor core has a pair of accommodating recesses adjacently located with a bridge portion arranged between the accommodating recesses. The pair of permanent magnets are accommodated in the corresponding accommodating recesses. The permanent magnets each have a magnetic pole surface and a magnetic pole facing surface facing each of the magnetic pole surfaces. The rotor core has a rotor outer circumferential surface as an outer circumferential surface. A d-axis and a q-axis are defined in the rotor. Each of the accommodating recesses has a magnet accommodating portion for accommodating the corresponding permanent magnet and a cavity at the q-axis side of the magnet accommodating portion. The cavities open in the rotor outer circumferential surface. The d-axis side of each of the cavities is formed by an outer cavity forming surface. A starting point of each of the outer cavity forming surfaces is located on the rotor outer circumferential surface. The outer cavity forming surfaces each intersect either the corresponding magnetic pole surface or an imaginary extended plane of the corresponding magnetic pole facing surface. The rotor outer circumferential surface includes a portion of an imaginary annular line. The starting points of the outer cavity forming surfaces are each located between the d-axis and an intersection point between the imaginary annular line and the corresponding imaginary extended plane.

When the cavity has the outer cavity forming surface, the core zone surrounded by the cavity, the magnet accommodating portion, and the outer circumferential surface of the rotor core is smaller in size than the core zone described in Japanese Laid-Open Patent Publication No. 2004-104962. This decreases centrifugal load acting on the bridge portion between the adjacent permanent magnets of symmetrical polarity arrangements. Specifically, the centrifugal load acting on the bridge portion between the magnet accommodating portions for accommodating the adjacent permanent magnets of the symmetrical polarity arrangements is decreased.

In a preferable example, the magnetic pole facing surfaces each face the corresponding magnetic pole surface to form the accommodating recess. An end point of each of the outer cavity forming surfaces is located on the imaginary extended plane of the corresponding one of the magnetic pole facing surfaces.

In another preferable example, the magnetic pole facing surfaces each face the corresponding magnetic pole surface to form the accommodating recess. An end point of each of the outer cavity forming surfaces is located on the corresponding one of the magnetic pole facing surfaces.

The end portion of the magnetic pole surface of each permanent magnet at the q-axis side, which is a magnetic pole end portion, is closest to the stator core. Generally, demagnetization may easily occur in this portion. However, in the above-described configuration, the portion is exposed to the cavity and thus prevents demagnetization.

In a preferable example, the magnetic pole facing surfaces each face the corresponding magnetic pole surface to form the accommodating recess. The permanent magnets each include an opposite magnetic pole surface at the opposite side to the associated magnetic pole surface. The accommodating recesses are each formed by an opposite magnetic pole facing surface facing the corresponding opposite magnetic pole surface. The magnet accommodating portions each have a positioning surface perpendicular to the associated opposite magnetic pole facing surface at the q-axis side. An end point of each of the outer cavity forming surfaces is located at the position where the corresponding magnetic pole facing surface and an imaginary extended plane of the positioning surface intersect each other.

In other words, the end point of the outer cavity forming surface is located on the boundary between the magnetic pole facing surface and the imaginary extended plane of the positioning surface. This decreases the size of the core zone surrounded by the cavity including the outer cavity forming surface, the magnet accommodating portion, and the rotor outer circumferential surface, compared to the size of the core zone described in Japanese Laid-Open Patent Publication No. 2004-104962.

In a preferable example, the q-axis side of each of the cavities is formed by an inner cavity forming surface. A starting point of each of the inner cavity forming surfaces is located on the rotor outer circumferential surface. The permanent magnets each have an opposite magnetic pole surface at the opposite side to the associated magnetic pole surface. The accommodating recesses are each partly formed by the corresponding opposite magnetic pole facing surface facing the opposite magnetic pole surface. The starting point of each of the inner cavity forming surfaces is located between the d-axis and an intersection point between an imaginary extended plane of the corresponding one of the opposite magnetic pole facing surfaces and the imaginary annular line.

In another preferable example, the q-axis side of each of the cavities is formed by an inner cavity forming surface. The permanent magnets each include an opposite magnetic pole surface at the opposite side to the associated magnetic pole surface. The accommodating recesses are each partly formed by an opposite magnetic pole facing surface facing the opposite magnetic pole surface. The q-axis side of each of the magnet accommodating portions is formed by a positioning surface intersecting the associated opposite magnetic pole facing surface. A starting point of each of the inner cavity forming surfaces is located on the rotor outer circumferential surface. An end point of each inner cavity forming surface is located at an end of the corresponding positioning surface.

The inner cavity forming surface, which is set in the above-described manner, effectively increases reluctance torque.

In a preferable example, the pair of the accommodating recesses are arranged in a V shape with the bridge portion located between the accommodating recesses.

According to the invention, a rotating electric machine having the permanent magnet embedded rotor configured in the above-described manner is provided.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1(*b*) is a longitudinal cross-sectional view showing the rotating electric machine;

FIG. 10(*b*) is an enlarged cross-sectional view showing a main portion of the eighth embodiment;

DETAILED DESCRIPTION OF THE PREFERRED EMBODIMENTS

Figure 1:
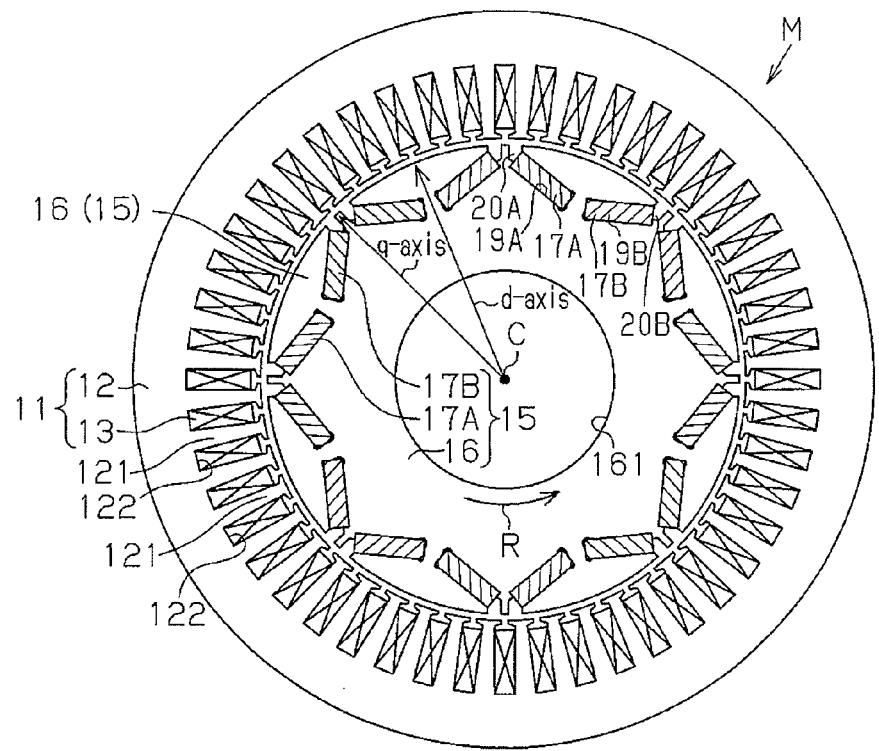
FIG. 1(*a*) is a lateral cross-sectional view showing a rotating electric machine according to a first embodiment of the present invention.
Figure 1:
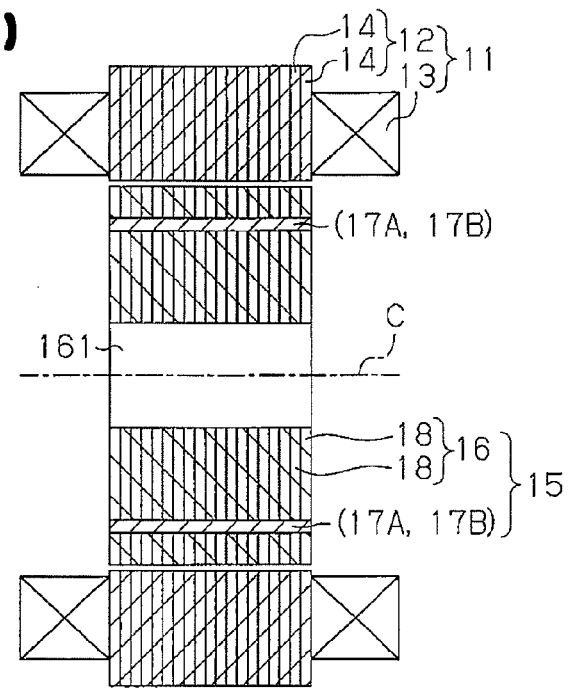
Figure 2:
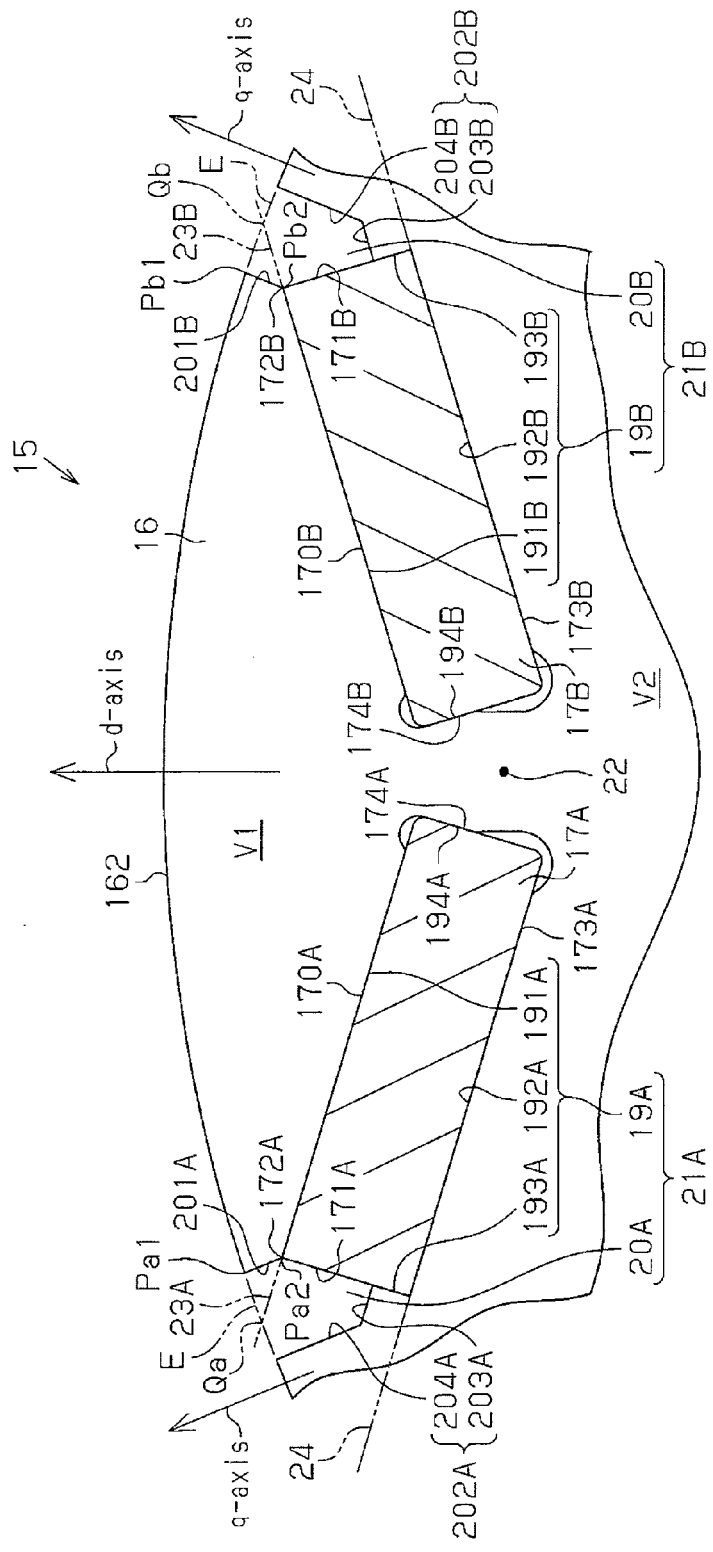
FIG. 2 is an enlarged cross-sectional view showing a portion of FIG. 1(*a*)
Figure 3:
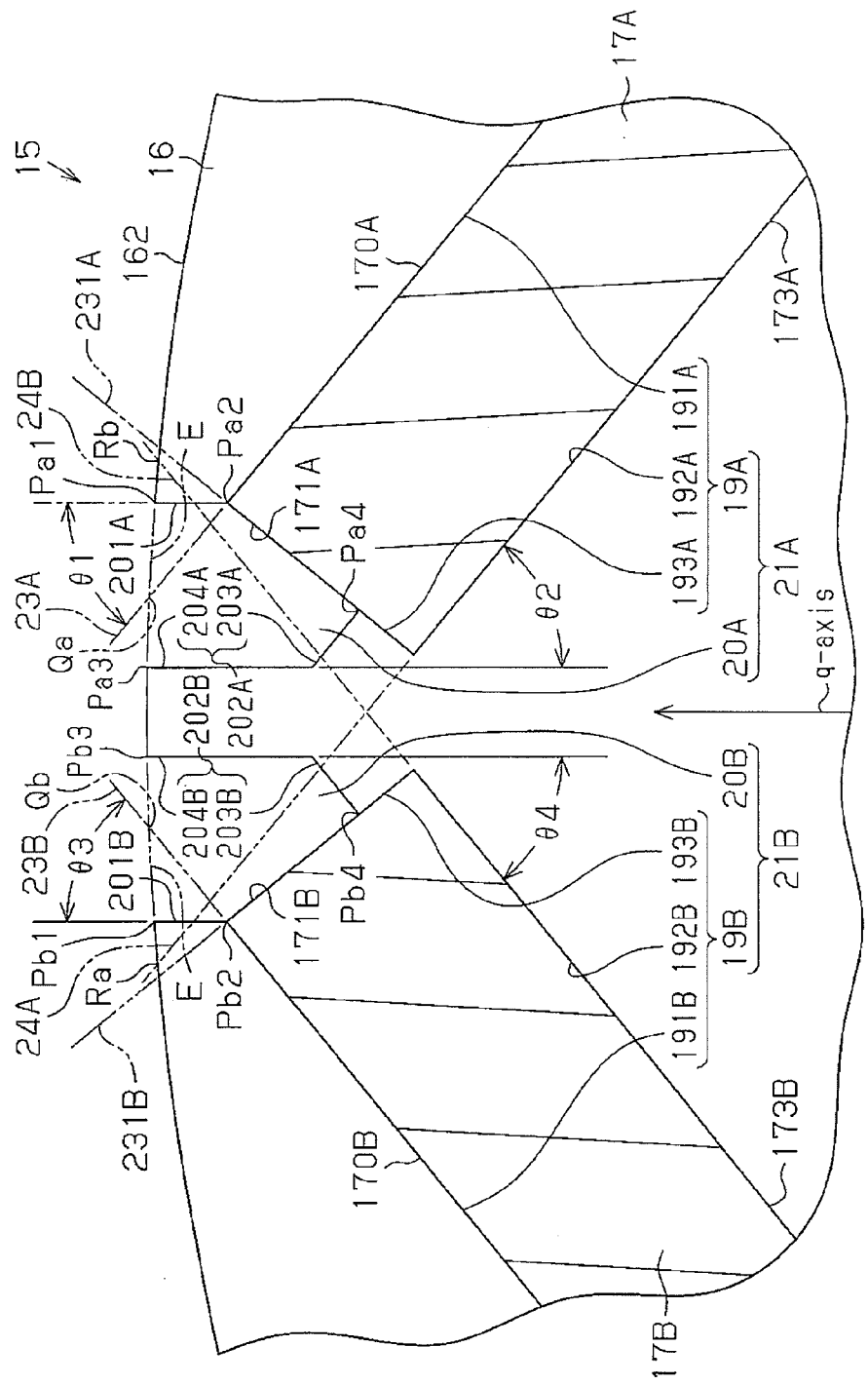
FIG. 3 is an enlarged view showing a main portion of FIG. 2.

FIGS. 1, 2, and 3 illustrate a first embodiment of the present invention, which is a permanent magnet embedded type rotating electric machine for a vehicle.

As shown in FIG. 1(*a*), a permanent magnet embedded type rotating electric machine M is an inner rotor type having a stator 11 and a rotor 15, which is arranged inside the stator 11. The stator 11 includes an annular stator core 12 and a plurality of coils 13, which are arranged along the inner circumference of the stator core 12. The stator core 12 has a plurality of teeth 121, which are arranged along the inner circumference of the stator core 12. The teeth 121 form slots 122, each of which receives one of the coils 13. The slots 122 are arranged in a circumferential direction of the stator 11, which is annular, and spaced at equal pitches.

With reference to FIG. 1(*b*), the stator core 12 is formed by layering a plurality of core plates 14, each of which is formed by a magnetic body (a steel plate).

As illustrated in FIG. 1(*a*), the rotor 15 has a rotor core 16 and multiple pairs (in the first embodiment, eight pairs) of flat plate-like first and second permanent magnets 17A, 17B, which are embedded in the rotor core 16. In other words, the rotor 15 is a permanent magnet embedded type rotor. The permanent magnets 17A, 17B, which are arranged in adjacent pairs, are uniformly shaped and equally sized. The pairs of the permanent magnets 17A, 17B are arranged rotationally symmetrical about the rotational axis C of the rotor 15.

With reference to FIG. 1(*b*), the rotor core 16 is formed by layering a plurality of core plates 18, each of which is formed by a magnetic body (a steel plate). A shaft hole 161 extends through a central portion of the rotor core 16. An output shaft (not shown) is passed through and fixed in the shaft hole 161.

As shown in FIG. 2, magnet accommodating portions 19A, 19B extend through the rotor core 16 in the direction in which the shaft hole 161 (see FIG. 1(*a*)) extends. The permanent magnets 17A, 17B are received in the corresponding magnet accommodating portions 19A, 19B.

The rotor core 16 has a rotor outer circumferential surface 162 serving as an outer circumferential surface, which is shaped as a circular circumferential surface of the rotor core 16. A surface 170A of each of the first permanent magnets 17A and a surface 170B of the corresponding second permanent magnet 17B at the side corresponding to the rotor outer circumferential surface 162 have the same magnetic pole. In other words, each pair of a permanent magnet 17A and the corresponding adjacent permanent magnet 17B form one magnetic pole. The multiple pairs of the permanent magnets 17A, 17B are embedded in the rotor core 16 and serve as magnetic poles, thus forming alternate magnetic poles in a circumferential direction. An end surface 171A of each first permanent magnet 17A closer to the rotor outer circumferential surface 162 is a first magnet outer end surface 171A serving as one of two magnet outer end surfaces of the corresponding magnet pair, which is formed by the first permanent magnet 17A and the corresponding permanent magnet 17B. An end surface 171B of each second permanent magnet 17B closer to the rotor outer circumferential surface 162 is a second magnet outer end surface 171B serving as the other one of the magnet outer end surfaces of the corresponding magnet pair, which is formed by the permanent magnet 17B and the corresponding permanent magnet 17A.

An end portion 172A of each first magnetic pole surface 170A closer to the rotor outer circumferential surface 162 is a first magnetic pole end portion 172A serving as one of two magnetic pole end portions of the corresponding magnet pair, which is formed by the permanent magnets 17A, 17B. An end portion 172B of each second magnetic pole surface 170B closer to the rotor outer circumferential surface 162 is a second magnetic pole end portion 172B serving as the other one of the magnetic pole end portions of the corresponding magnet pair, which is formed by the permanent magnets 17A, 17B. The first magnetic pole end portion 172A is located closest to the rotor outer circumferential surface 162 in each first permanent magnet 17A. The second magnetic pole end portion 172B is closest to the rotor outer circumferential surface 162 in each second permanent magnet 17B.

A first cavity 20A is formed near the end of each first magnet accommodating portion 19A closer to the rotor outer circumferential surface 162. The first cavity 20A is continuous with the first magnet accommodating portion 19A. A second cavity 20B is formed near the end of each second magnet accommodating portion 19B closer to the rotor outer circumferential surface 162. The second cavity 20B is continuous with the second magnet accommodating portion 19B. The cavities 20A, 20B open through the rotor outer circumferential surface 162.

The cavities 20A, 20B are cavities for preventing a short-circuited magnetic flux, which remain at the opposite sides of each magnet pair after the permanent magnets 17A, 17B are received in the corresponding magnet accommodating portions 19A, 19B. Each first magnet accommodating portion 19A, which accommodates the corresponding first permanent magnet 17A, and the first cavity 20A at the side corresponding to the first magnetic pole end portion 172A of the first permanent magnet 17A form a first accommodating recess 21A formed in the rotor core 16. Each second magnet accommodating portion 19B, which accommodates the corresponding second permanent magnet 17B, and the second cavity 20B at the side corresponding to the second magnetic pole end portion 172B of the second permanent magnet 17B form a second accommodating recess 21B formed in the rotor core 16.

The d-axis in FIG. 1(a) represents the direction of a magnetic flux formed by each magnetic pole. In other words, the d-axis is the axis between the permanent magnets of each magnet pair of symmetrical polarity arrangements. The q-axis represents an axis that is electrically and magnetically perpendicular to the d-axis. That is, the q-axis is the axis between the permanent magnets of asymmetrical polarity arrangements. Each first accommodating recess 21A for accommodating the corresponding first permanent magnet 17A is formed by the associated first magnet accommodating portion 19A and the first cavity 20A, which is at the q-axis side of the first magnet accommodating portion 19A. Each second accommodating recess 21B, which accommodates the corresponding second permanent magnet 17B, is formed by the associated second magnet accommodating portion 19B and the second cavity 20B, which is at the q-axis side of the second magnet accommodating portion 19B. Each first accommodating recess 21A and the corresponding second accommodating recess 21B are arranged in a V shape with respect to the d-axis located between the accommodating recesses 21A, 21B. In the first embodiment, the V shape spreads toward the rotor outer circumferential surface 162. The cavities 20A, 20B function each as a magnetic flux barrier, thus allowing a magnetic flux to effectively act on the torque produced by the rotor 15.

As illustrated in FIG. 2, a pair of permanent magnets forms one magnetic pole. The first magnetic pole end portion 172A is the magnetic pole end portion at the q-axis side of each first permanent magnet 17A. The second magnetic pole end portion 172B is the magnetic pole end portion at the q-axis side of each second permanent magnet 17B.

The surfaces forming each first magnet accommodating portion 19A include a first magnetic pole facing surface 191A and a first opposite magnetic pole facing surface 192A. The first magnetic pole facing surface 191A is a magnetic-pole-side facing surface that faces the first magnetic pole surface 170A of the corresponding first permanent magnet 17A. The first opposite magnetic pole facing surface 192A is an opposite-magnetic-pole-side facing surface that faces a first opposite magnetic pole surface 173A, which is an opposite magnetic pole surface at the opposite side to the first magnetic pole surface 170A of the first permanent magnet 17A. The surfaces forming the first magnet accommodating portion 19A further include a first positioning surface 193A and a first opposite end surface 194A. The first positioning surface 193A faces the first magnet outer end surface 171A of the corresponding first permanent magnet 17A. The first opposite end surface 194A faces a first magnet inner end surface 174A, which is the other end surface of the first permanent magnet 17A. The first opposite magnetic pole facing surface 192A of the first magnet accommodating portion 19A faces the first opposite magnetic pole surface 173A of the first permanent magnet 17A. The plane corresponding to the first positioning surface 193A intersects the plane corresponding to the first opposite magnetic pole facing surface 192A of the first magnet accommodating portion 19A at the q-axis side. The first permanent magnet 17A is positioned between the first opposite end surface 194A and the first positioning surface 193A.

The surfaces forming each second magnet accommodating portion 19B include a second magnetic pole facing surface 191B and a second opposite magnetic pole facing surface 192B. The second magnetic pole facing surface 191B is a magnetic-pole-side facing surface that faces the second magnetic pole surface 170B of the corresponding second permanent magnet 17B. The second opposite magnetic pole facing surface 192B is an opposite-magnetic-pole-side facing surface that faces a second opposite magnetic pole surface 173B, which is an opposite magnetic pole surface at the opposite side to the second magnetic pole surface 170B of the second permanent magnet 17B. The surfaces forming the second magnet accommodating portion 19B further include a second positioning surface 193B and a second opposite end surface 194B. The second positioning surface 193B faces the second magnet outer end surface 171B of the second permanent magnet 17B. The second opposite end surface 194B faces a second magnet inner end surface 174B, which is the other end surface of the second permanent magnet 17B. The second opposite magnetic pole facing surface 192B of the second magnet accommodating portion 19B faces the second opposite magnetic pole surface 173B of the second permanent magnet 17B. The plane corresponding to the second positioning surface 193B intersects the plane corresponding to the second opposite magnetic pole facing surface 192B of the second magnet accommodating portion 19B at the q-axis side. The second permanent magnet 17B is positioned between the second opposite end surface 194B and the second positioning surface 193B.

The first opposite end surface 194A and the second opposite end surface 194B form a bridge portion 22 between the magnet accommodating portions 19A, 19B. In other words, the bridge portion 22 is formed by the first opposite end surface 194A and the second opposite end surface 194B, which are adjacent to each other with the d-axis located between the opposite end surfaces 194A and 194B, at the position between the two magnet accommodating portions 19A, 19B, which also are adjacent to each other with the d-axis located between the magnet accommodating portions 19A, 19B. The first and second accommodating recesses 21A, 21B are arranged in a V shape with the bridge portion 22 located between the accommodating recesses 21A, 21B.

With reference to FIG. 3, the first cavity 20A, which opens through the rotor outer circumferential surface 162, is formed by a first outer cavity forming surface 201A and a first inner cavity forming surface 202A. In other words, the d-axis side of the first cavity 20A (see FIG. 2) is formed by the first outer cavity forming surface 201A. The q-axis side of the first cavity 20A is formed by the first inner cavity forming surface 202A. The first outer cavity forming surface 201A is continuous with the first magnetic pole facing surface 191A. The first inner cavity forming surface 202A is continuous with the first positioning surface 193A. The first outer cavity forming surface 201A forms an acute angle θ1 with respect to the first magnetic pole facing surface 191A and is continuous with the first magnetic pole facing surface 191A. The starting point of the first outer cavity forming surface 201A is the point Pa1 on the rotor outer circumferential surface 162. The end point of the first outer cavity forming surface 201A is the intersection point Pa2 between the first magnetic pole facing surface 191A and an imaginary extended plane 231A of the first positioning surface 193A. The first magnetic pole facing surface 191A faces the first magnetic pole surface 170A of the first permanent magnet 17A. The starting point Pa1 is located between the d-axis and the intersection point Qa between an imaginary annular line E and an imaginary extended plane 23A of the first magnetic pole facing surface 191A (see FIG. 2). The rotor outer circumferential surface 162 includes portions of the imaginary annular line E. The imaginary annular line E of the first embodiment is a circle. The first outer cavity forming surface 201A intersects the imaginary extended plane 23A of the first positioning surface 193A.

The first inner cavity forming surface 202A is formed by a first proximal surface 203A and a first inner flat surface 204A. The first proximal surface 203A is parallel to the first opposite magnetic pole facing surface 192A. The first inner flat surface 204A is continuous with the first proximal surface 203A and forms an acute angle θ2 with respect to the first opposite magnetic pole facing surface 192A. The starting point of the first inner cavity forming surface 202A is the point Pa3 on the rotor outer circumferential surface 162. The end point of the first inner cavity forming surface 202A is the point Pa4 at the corresponding end of the first positioning surface 193A. The starting point Pa3 of the first inner cavity forming surface 202A is located between the d-axis and the intersection point Ra between an imaginary extended plane 24A of the first opposite magnetic pole facing surface 192A and the rotor outer circumferential surface 162 (see FIG. 2).

The second cavity 20B, which opens through the rotor outer circumferential surface 162, is formed by a second outer cavity forming surface 201B and a second inner cavity forming surface 202B. In other words, the d-axis side of the second cavity 20B (see FIG. 2) is formed by the second outer cavity forming surface 201B. The q-axis side of the second cavity 20B is formed by the second inner cavity forming surface 202B. The second outer cavity forming surface 201B is continuous with the second magnetic pole facing surface 191B. The second inner cavity forming surface 202B is continuous with the second positioning surface 193B. The second outer cavity forming surface 201B forms an acute angle θ3 with respect to the second magnetic pole facing surface 191B and is continuous with the second magnetic pole facing surface 191B. The starting point of the second outer cavity forming surface 201B is the point Pb1 on the rotor outer circumferential surface 162. The end point of the second outer cavity forming surface 201B is the intersection point Pb2 between the second magnetic pole facing surface 191B and an imaginary extended plane 231B of the second positioning surface 193B. The second magnetic pole facing surface 191B faces the second magnetic pole surface 170B of the second permanent magnet 17B. The starting point Pb1 of the second outer cavity forming surface 201B is located between the d-axis and the intersection point Qb between an imaginary annular line E and an imaginary extended plane 23B of the second magnetic pole facing surface 191B (see FIG. 2). The second outer cavity forming surface 201B intersects the imaginary extended plane 23B of the second positioning surface 193B. The rotor outer circumferential surface 162 includes portions of the imaginary annular line E.

The second inner cavity forming surface 202B is formed by a second proximal surface 203B and a second inner flat surface 204B. The second proximal surface 203B is parallel to the second opposite magnetic pole facing surface 192B. The second inner flat surface 204B is continuous with the second proximal surface 203B and forms an acute angle θ4 with respect to the second opposite magnetic pole facing surface 192B. The starting point of the second inner cavity forming surface 202B is the point Pb3 on the rotor outer circumferential surface 162. The end point of the second inner cavity forming surface 202B is the point Pb4 at the corresponding end of the second positioning surface 193B. The starting point Pb3 of the second inner cavity forming surface 202B is located between the d-axis and the intersection point Rb between an imaginary extended plane 24B of the second opposite magnetic pole facing surface 192B and the rotor outer circumferential surface 162 (see FIG. 2).

FIG. 2 illustrates a first core zone V1 in the rotor core 16. The first core zone V1 is surrounded by the magnetic pole facing surfaces 191A, 191B of the magnet accommodating portions 19A, 19B, the outer cavity forming surfaces 201A, 201B, and the rotor outer circumferential surface 162. Specifically, the portion of the rotor outer circumferential surface 162 corresponding to the first core zone V1 is the range in the rotor outer circumferential surface 162 between the outer ends of the outer cavity forming surfaces 201A, 201B located on the rotor outer circumferential surface 162, or, in other words, the range between the starting point Pa1 and the starting point Pb1. The first core zone V1 of the rotor core 16 is connected to a second core zone V2, which is a range in the rotor core 16 radially inward to the accommodating recesses 21A, 21B, only through the bridge portion 22.

Operation of the first embodiment will hereafter be described.

As the coils 13 receive electric power and the rotor 15 rotates, load produced by centrifugal force acting in the first core zone V1 fully acts on the bridge portion 22 as a tensile load. For a constant rotating speed of the rotor 15, the tensile load is proportional to the weight of the first core zone V1. The first outer cavity forming surface 201A is inclined away from the imaginary extended plane 23A of the first magnetic pole facing surface 191A and in a direction separating from the rotational axis C. The second outer cavity forming surface 201B is inclined away from the imaginary extended plane 23B of the second magnetic pole facing surface 191B and in a direction separating from the rotational axis C. In other words, the first core zone V1 is smaller in size than a comparative zone V3 (not shown) in the rotor core 16. The comparative zone V3 is surrounded by the magnetic pole facing surfaces 191A, 191B, the imaginary extended planes 23A, 23B of the magnetic pole facing surfaces 191A, 191B, and the portion of the rotor outer circumferential surface 162 between the outer ends of the imaginary extended planes 23A, 23B on the rotor outer circumferential surface 162, which are the intersection point Qa and the intersection point Qb. That is, the load caused by the centrifugal force acting in the first core zone V1 is less intense than the load caused by the centrifugal force acting in the comparative zone V3.

The first embodiment has the advantages described below.

(1) Each first outer cavity forming surface 201A extends from the starting point Pa1 on the rotor outer circumferential surface 162 to the intersection point Pa2, which is on the boundary between the first magnetic pole facing surface 191A and the imaginary extended plane 23A of the first magnetic pole facing surface 191A. The second outer cavity forming surface 201B extends from the starting point Pb1 on the rotor outer circumferential surface 162 to the intersection point Pb2, which is on the boundary between the second magnetic pole facing surface 191B and the imaginary extended plane 23B of the second magnetic pole facing surface 191B. The first core zone V1 is surrounded by the cavities 20A, 20B each having the outer cavity forming surface 201A, 201B, the magnet accommodating portions 19A, 19B, and the rotor outer circumferential surface 162. This arrangement decreases the size of the first core zone V1 compared to the case described in Japanese Laid-Open Patent Publication No. 2004-104962, for example, in which outer cavity forming surfaces are located on the imaginary extended planes 23A, 23B of the magnetic pole facing surfaces 191A, 191B. As a result, the centrifugal load acting on the bridge portion 22 is decreased. In other words, the centrifugal load on the bridge portion 22, which is between the magnet accommodating portions 19A, 19B for accommodating the corresponding adjacent permanent magnets 17A, 17B of symmetrical polarity arrangements, is decreased.

(2) The starting point Pa3 of each first inner cavity forming surface 202A is located between the d-axis and the intersection point Ra between the imaginary extended plane 24A of the first opposite magnetic pole facing surface 192A and the rotor outer circumferential surface 162. The starting point Pb3 of each second inner cavity forming surface 202B is located between the d-axis and the intersection point Rb between the imaginary extended plane 24B of the second opposite magnetic pole facing surface 192B and the rotor outer circumferential surface 162. This arrangement increases the size of the core zone between the inner cavity forming surfaces 202A, 202B, which are adjacent to each other with the q-axis located between the inner cavity forming surface 202A, 202B. As a result, the inner cavity forming surfaces 202A, 202B are effective in increasing reluctance torque.

Figure 4:
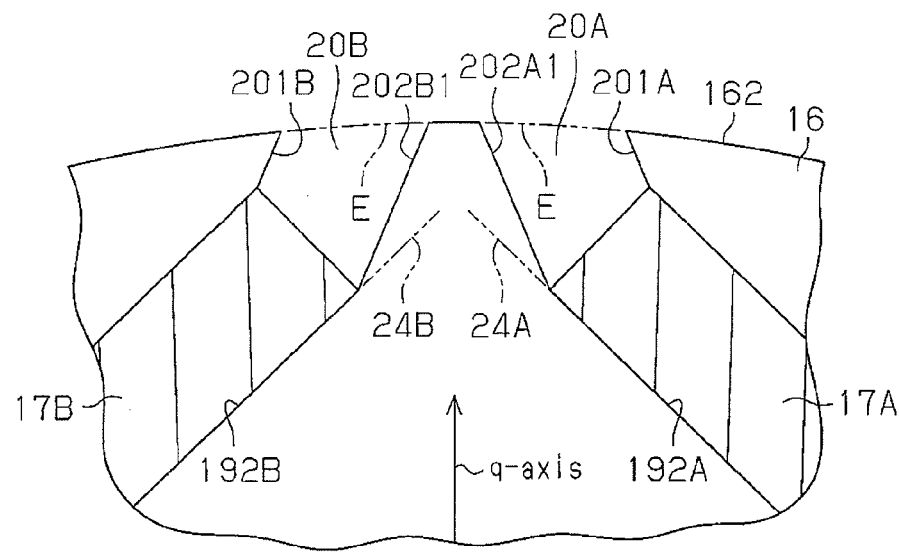
FIG. 4 is an enlarged cross-sectional view showing a portion of a second embodiment of the invention.

FIG. 4 illustrates a second embodiment of the present invention. Same or like reference numerals are given to components of the second embodiment that are the same as or like corresponding components of the first embodiment and detailed description of the components is omitted herein.

A first inner cavity forming surface 202A1 and a second inner cavity forming surface 202B1 are shaped as flat surfaces extending to the rotor outer circumferential surface 162. The end point of the flat shape of the first inner cavity forming surface 202A1 is on the boundary between the imaginary extended plane 24A of the first opposite magnetic pole facing surface 192A and the first opposite magnetic pole facing surface 192A. The end point of the second inner cavity forming surface 202B1 is on the boundary between the imaginary extended plane 24B of the second opposite magnetic pole facing surface 192B and the second opposite magnetic pole facing surface 192B. The inner cavity forming surfaces 202A1, 202B1 also function to position the corresponding permanent magnets 17A, 17B, like the positioning surfaces 193A, 193B of the first embodiment.

Figure 5:
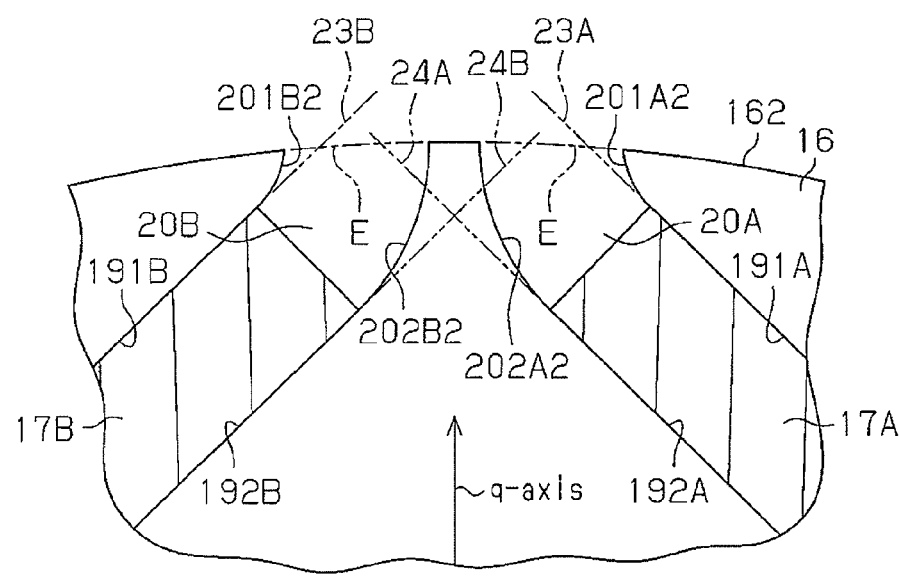
FIG. 5 is an enlarged cross-sectional view showing a portion of a third embodiment of the invention.

FIG. 5 illustrates a third embodiment of the invention. Same or like reference numerals are given to components of the third embodiment that are the same as or like corresponding components of the first embodiment and detailed description of the components is omitted herein.

A first outer cavity forming surface 201A2 and a second outer cavity forming surface 201B2 are shaped as projected round surfaces extending to the rotor outer circumferential surface 162 separately from the imaginary extended planes 23A, 23B of the corresponding magnetic pole facing surfaces 191A, 191B. The end point of the projected round shape of the first outer cavity forming surface 201A2 is on the boundary between the first magnetic pole facing surface 191A and the imaginary extended plane 23A of the first magnetic pole facing surface 191A. The end point of the projected round shape of the second outer cavity forming surface 201B2 is on the boundary between the second magnetic pole facing surface 191B and the imaginary extended plane 23B of the second magnetic pole facing surface 191B. A first inner cavity forming surface 202A2 and a second inner cavity forming surface 202B2 are shaped as recessed round surfaces extending to the rotor outer circumferential surface 162 separately from the imaginary extended planes 24A, 24B of the corresponding opposite magnetic pole facing surfaces 192A, 192B. The end point of the recessed round shape of the first inner cavity forming surface 202A2 is on the boundary between the first opposite magnetic pole facing surface 192A and the imaginary extended plane 24A of the first opposite magnetic pole facing surface 192A. The end point of the recessed round shape of the second inner cavity forming surface 202B2 is on the boundary between the second opposite magnetic pole facing surface 192B and the imaginary extended plane 24B of the second opposite magnetic pole facing surface 192B. The inner cavity forming surfaces 202A2, 202B2 also function to position the corresponding permanent magnets, as in the case of the positioning surfaces 193A, 193B of the first embodiment.

Figure 6:
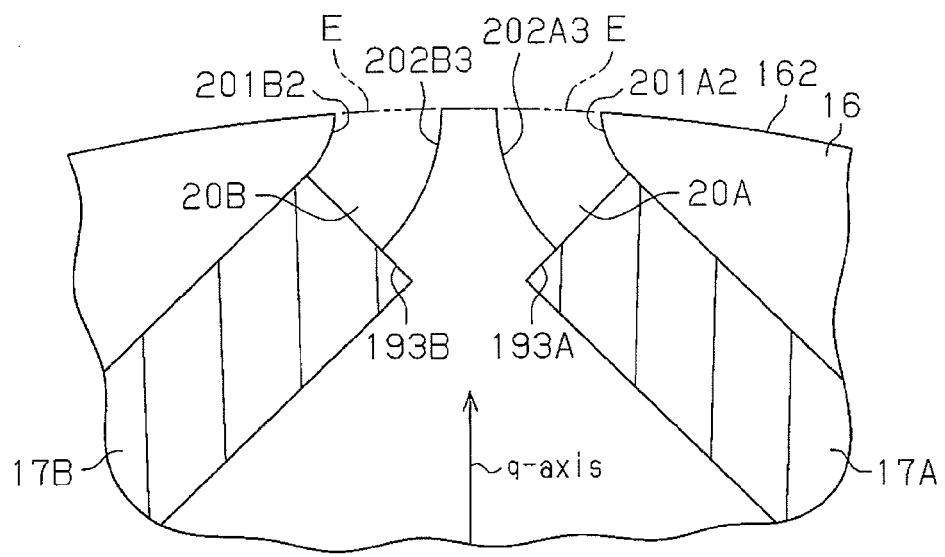
FIG. 6 is an enlarged cross-sectional view showing a portion of a fourth embodiment of the invention.

FIG. 6 illustrates a fourth embodiment of the invention. Same or like reference numerals are given to components of the fourth embodiment that are the same as or like corresponding components of the first embodiment and detailed description of the components is omitted herein.

A first inner cavity forming surface 202A3 and a second inner cavity forming surface 202B3 are shaped as recessed round surfaces extending to the rotor outer circumferential surface 162. The end point of the first inner cavity forming surface 202A3 is the corresponding end of the first positioning surface 193A. The end point of the second inner cavity forming surface 202B3 is the corresponding end of the second positioning surface 193B.

Figure 7:
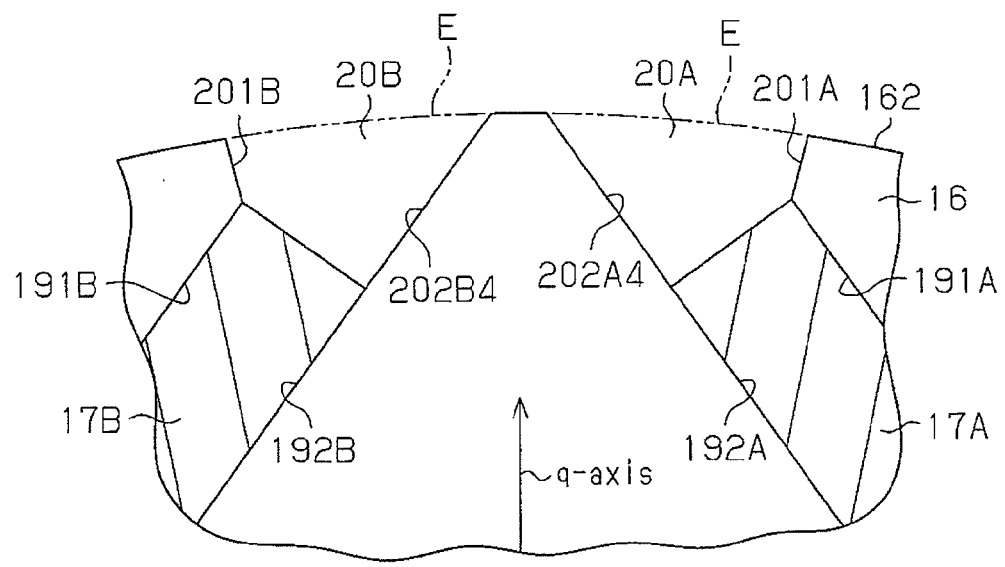
FIG. 7 is an enlarged cross-sectional view showing a portion of a fifth embodiment of the invention.

FIG. 7 illustrates a fifth embodiment of the invention. Same or like reference numerals are given to components of the fifth embodiment that are the same as or like corresponding components of the first embodiment and detailed description of the components is omitted herein.

A first inner cavity forming surface 202A4 is flush with the first opposite magnetic pole facing surface 192A. A second inner cavity forming surface 202B4 is flush with the second opposite magnetic pole facing surface 192B. The first permanent magnet 17A is bonded to the first magnetic pole facing surface 191A and the first opposite magnetic pole facing surface 192A with adhesive. The second permanent magnet 17B is bonded to the second magnetic pole facing surface 191B and the second opposite magnetic pole facing surface 192B with adhesive.

Figure 8:
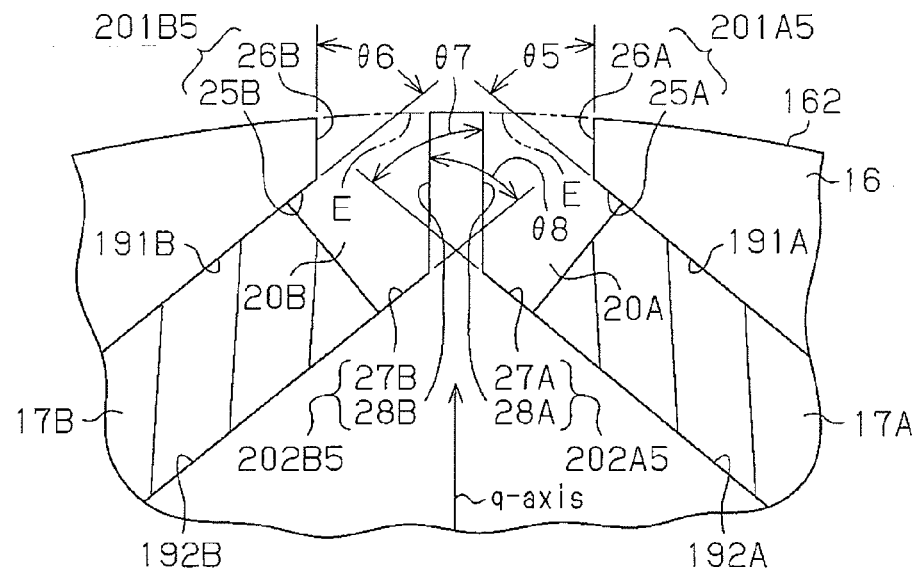
FIG. 8 is an enlarged cross-sectional view showing a portion of a sixth embodiment of the invention.

FIG. 8 illustrates a sixth embodiment of the invention. Same or like reference numerals are given to components of the sixth embodiment that are the same as or like corresponding components of the first embodiment and detailed description of the components is omitted herein.

A first outer cavity forming surface 201A5 is formed by a proximal surface 25A, which is flush with the first magnetic pole facing surface 191A, and a first outer flat surface 26A. The first outer flat surface 26A is continuous with the proximal surface 25A and forms an acute angle θ5 with respect to the first magnetic pole facing surface 191A. The end point of the first outer flat surface 26A is the corresponding end of the proximal surface 25A.

A second outer cavity forming surface 201B5 is formed by a proximal surface 25B, which is flush with the second magnetic pole facing surface 191B, and a second outer flat surface 26B. The second outer flat surface 26B is continuous with the proximal surface 25B and forms an acute angle θ6 with respect to the second magnetic pole facing surface 191B. The end point of the second outer flat surface 26B is the corresponding end of the proximal surface 25B.

A first inner cavity forming surface 202A5 is formed by a proximal surface 27A, which is flush with the first opposite magnetic pole facing surface 192A, and a first inner flat surface 28A. The first inner flat surface 28A is continuous with the proximal surface 27A and forms an acute angle θ7 with respect to the first opposite magnetic pole facing surface 192A. The end point of the first inner flat surface 28A is the corresponding end of the proximal surface 27A.

A second inner cavity forming surface 202B5 is formed by a proximal surface 27B, which is flush with the second opposite magnetic pole facing surface 192B, and a second inner flat surface 28B. The second inner flat surface 28B is continuous with the proximal surface 27B and forms an acute angle θ8 with respect to the second opposite magnetic pole facing surface 192B. The end point of the second inner flat surface 28B is the corresponding end of the proximal surface 27B.

Figure 9:
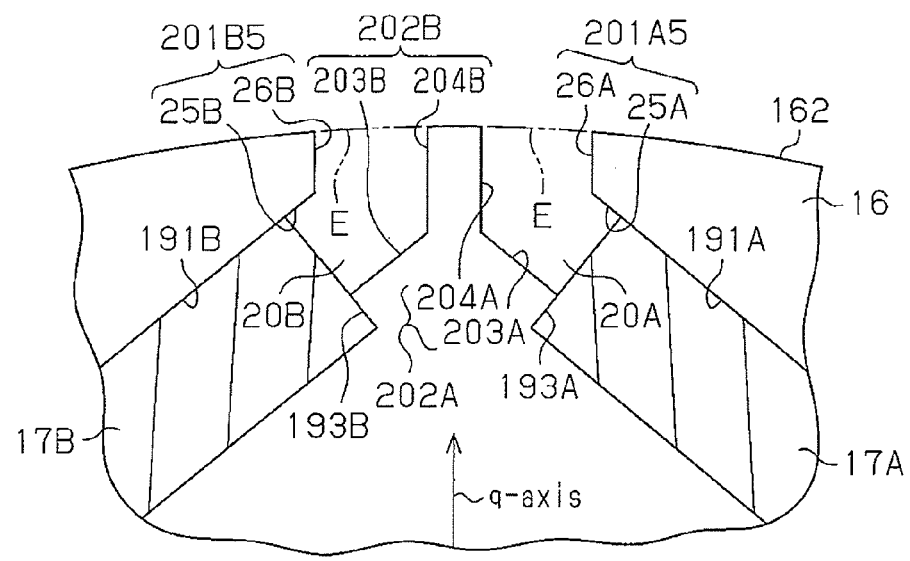
FIG. 9 is an enlarged cross-sectional view showing a portion of a seventh embodiment of the invention.

FIG. 9 illustrates a seventh embodiment of the invention. The first cavity 20A of the seventh embodiment is formed by the first outer cavity forming surface 201A5 of the sixth embodiment and the first inner cavity forming surface 202A of the first embodiment. The second cavity 20B of the seventh embodiment is formed by the second outer cavity forming surface 201B5 of the sixth embodiment and the second inner cavity forming surface 202B of the first embodiment.

Figure 10A:
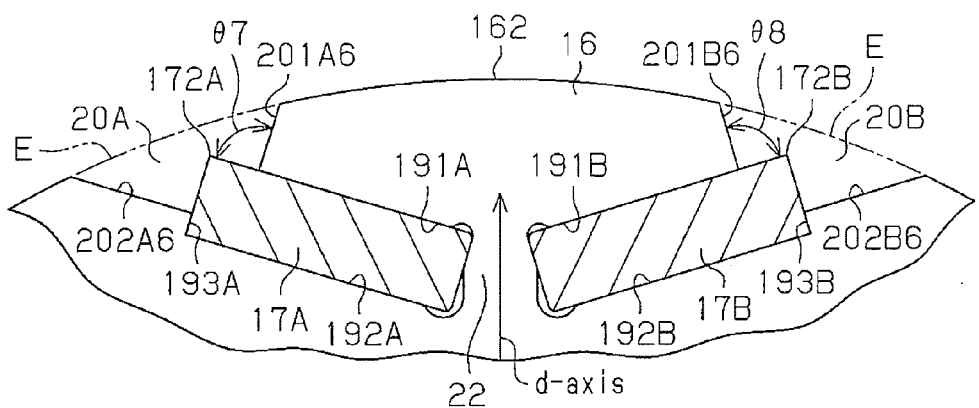
FIG. 10(*a*) is an enlarged cross-sectional view showing a portion of an eighth embodiment of the invention.
Figure 10B:
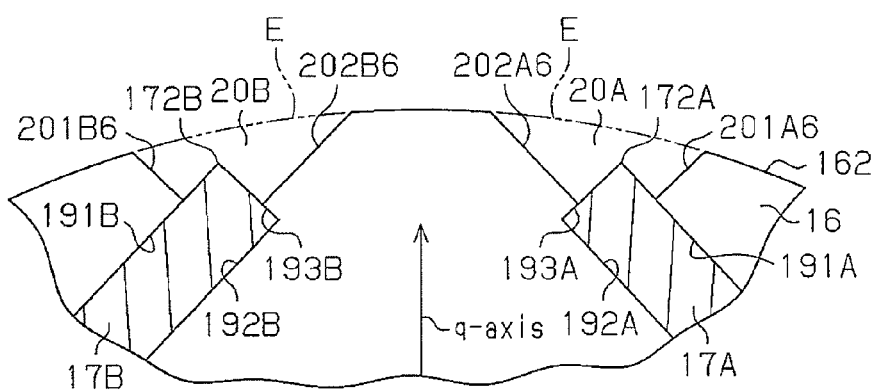

FIGS. 10(*a*) and 10(*b*) illustrate an eighth embodiment of the invention. Same or like reference numerals are given to components of the eighth embodiment that are the same as or like corresponding components of the first embodiment and detailed description of the components is omitted herein.

A first outer cavity forming surface 201A6 is shaped as a flat surface. The first outer cavity forming surface 201A6 is continuous with the first magnetic pole facing surface 191A and forms an angle θ7 with respect to the first magnetic pole facing surface 191A. The end point of the first outer cavity forming surface 201A6 is on the first magnetic pole facing surface 191A.

A second outer cavity forming surface 201B6 is shaped as a flat surface. The second outer cavity forming surface 201B6 is continuous with the second magnetic pole facing surface 191B and forms an angle θ8 with respect to the second magnetic pole facing surface 191B. The end point of the second outer cavity forming surface 201B6 is on the second magnetic pole facing surface 191B.

A first inner cavity forming surface 202A6 is shaped as a flat surface that is continuous with the corresponding end of the first positioning surface 193A and parallel to the first opposite magnetic pole facing surface 192A.

A second inner cavity forming surface 202B6 is shaped as a flat surface that is continuous with the corresponding end of the second positioning surface 193B and parallel to the second opposite magnetic pole facing surface 192B.

The eighth embodiment has the advantage described below in addition to the same advantage as the advantage (1) of the first embodiment.

(3) The magnetic pole end portions 172A, 172B are located closest to the inner circumferential surface of the stator core 12 in the permanent magnets 17A, 17B. If a solid portion of the rotor core 16 is located at proximities to the magnetic pole end portions 172A, 172B, demagnetization easily occurs in the magnetic pole end portions 172A, 172B. However, in the eighth embodiment, the first magnetic pole end portion 172A is exposed to the first cavity 20A and the second magnetic pole end portion 172B is exposed to the second cavity 20B, thus preventing demagnetization.

Figure 11:
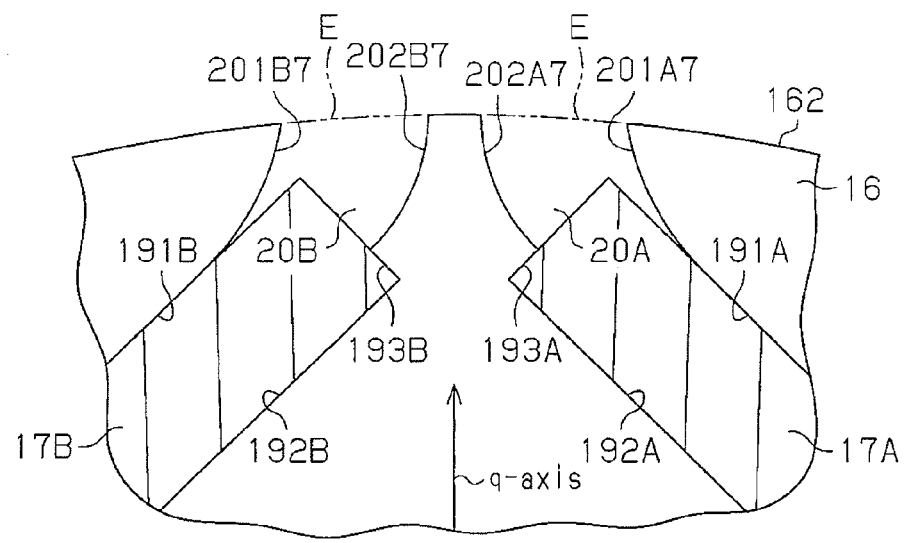
FIG. 11 is an enlarged cross-sectional view showing a portion of a ninth embodiment of the invention.

FIG. 11 illustrates a ninth embodiment of the invention. Same or like reference numerals are given to components of the ninth embodiment that are the same as or like corresponding components of the first embodiment and detailed description of the components is omitted herein.

A first outer cavity forming surface 201A7 is shaped as a projected round surface smoothly continuous with the first magnetic pole facing surface 191A. A first inner cavity forming surface 202A7 is shaped as a recessed round surface continuous with the corresponding end of the first positioning surface 193A.

A second outer cavity forming surface 201B7 is shaped as a projected round surface smoothly continuous with the second magnetic pole facing surface 191B. A second inner cavity forming surface 202B7 is shaped as a recessed round surface continuous with the corresponding end of the second positioning surface 193B.

Figure 12:
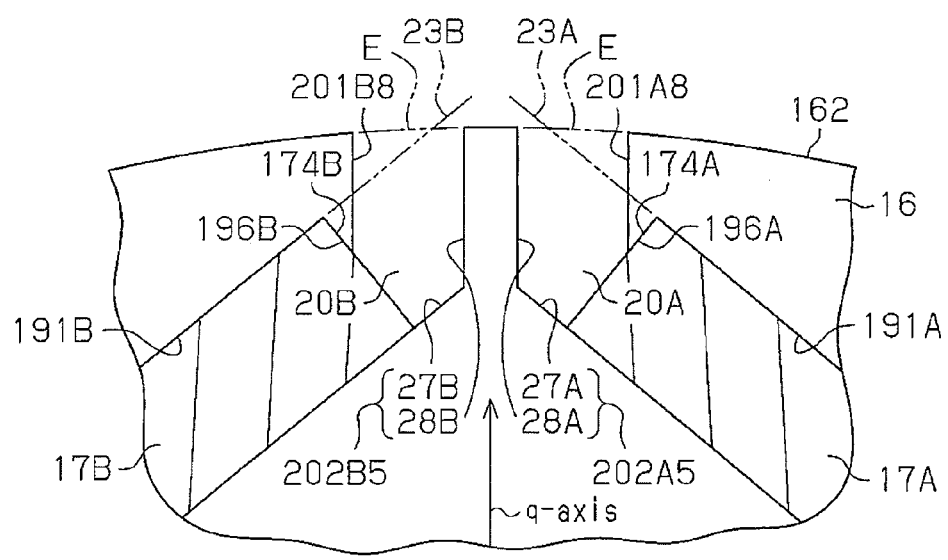
FIG. 12 is an enlarged cross-sectional view showing a portion of a tenth embodiment of the invention.

FIG. 12 illustrates a tenth embodiment of the invention. Same or like reference numerals are given to components of the tenth embodiment that are the same as or like corresponding components of the first embodiment and detailed description of the components is omitted herein.

A portion of the first magnet accommodating portion 19A is formed by the first positioning surface 196A, which is continuous with the first magnetic pole facing surface 191A. The first positioning surface 196A faces the magnet inner end surface 174A of the first permanent magnet 17A. A first outer cavity forming surface 201A8 is shaped as a flat surface intersecting the imaginary extended plane 23A of the first magnetic pole facing surface 191A. The end point of the first outer cavity forming surface 201A8 is the corresponding end of the first positioning surface 196A.

A portion of the second magnet accommodating portion 19B is formed by the second positioning surface 196B, which is continuous with the second magnetic pole facing surface 191B. The second positioning surface 196B faces the magnet inner end surface 174B of the second permanent magnet 17B. A second outer cavity forming surface 201B8 is shaped as a flat surface intersecting the imaginary extended plane 23B of the second magnetic pole facing surface 191B. The end point of the second outer cavity forming surface 201B8 is the corresponding end of the second positioning surface 196B.

Figure 13:
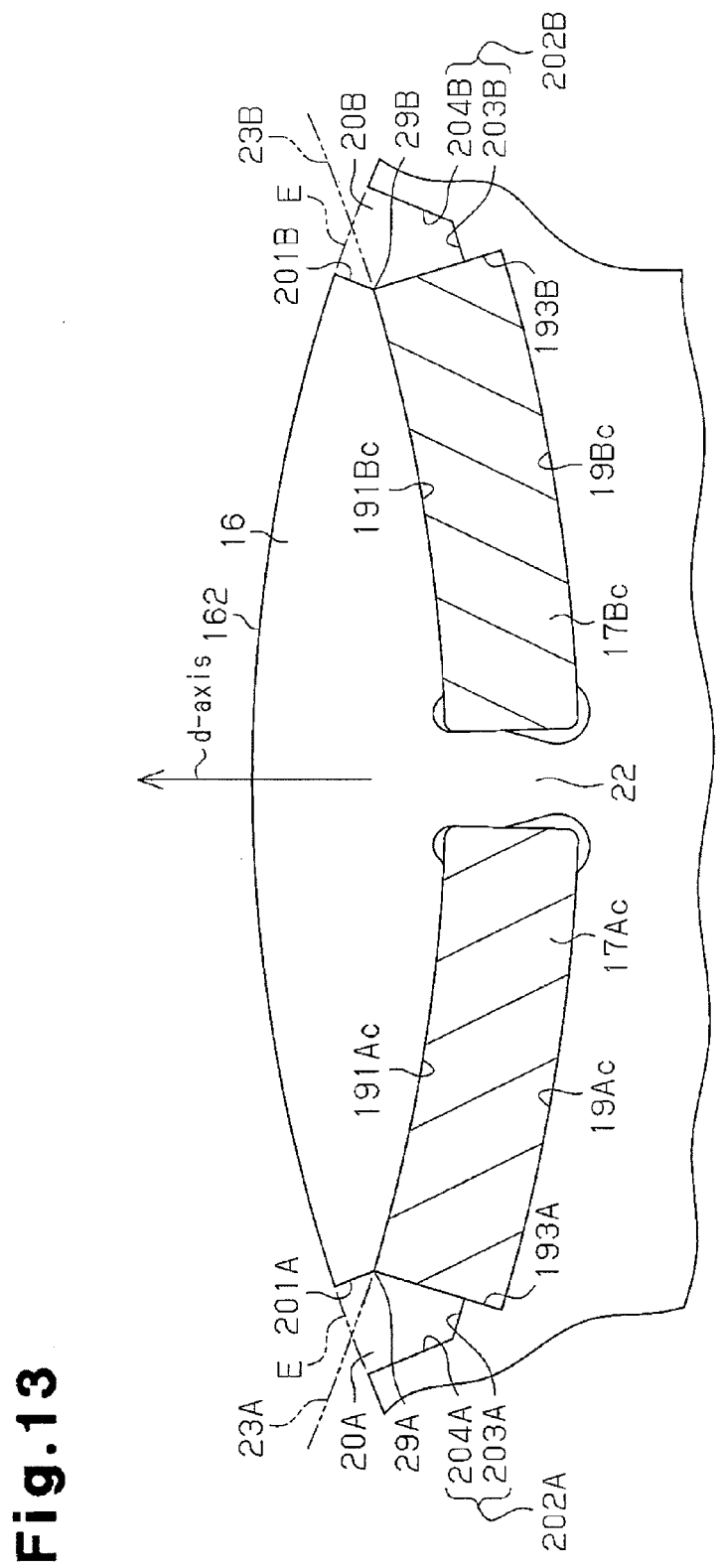
FIG. 13 is an enlarged cross-sectional view showing a portion of an eleventh embodiment of the invention.

FIG. 13 illustrates an eleventh embodiment of the invention. Same or like reference numerals are given to components of the eleventh embodiment that are the same as or like corresponding components of the first embodiment and detailed description of the components is omitted herein.

A first magnet accommodating portion 19Ac is shaped as an arcuate recess. A first permanent magnet 17Ac is shaped as an arcuate curved plate. The end point of the first outer cavity forming surface 201A is on an imaginary extended plane 23A of an arcuate first magnetic pole facing surface 191Ac. The imaginary extended plane 23A of the arcuate first magnetic pole facing surface 191Ac is a flat plane formed by moving a tangential plane contacting the arcuate first magnetic pole facing surface 191Ac to an end 29A of the first magnetic pole facing surface 191Ac while maintaining contact between the tangential plane and the first magnetic pole facing surface 191Ac.

A second magnet accommodating portion 19Bc is shaped as an arcuate recess. A second permanent magnet 17Bc is shaped as an arcuate curved plate. The end point of the second outer cavity forming surface 201B is on an imaginary extended plane 23B of an arcuate second magnetic pole facing surface 191Bc. The imaginary extended plane 23B of the arcuate second magnetic pole facing surface 191Bc is a flat plane formed by moving a tangential plane contacting the arcuate second magnetic pole facing surface 191Bc to an end 29B of the second magnetic pole facing surface 191Bc while maintaining contact between the tangential plane and the second magnetic pole facing surface 191Bc.

The present invention may be embodied in the form described below.

In the eighth embodiment illustrated in FIG. 10, the inner cavity forming surface of any one of the second to seventh embodiments may be employed as the inner cavity forming surface.

The invention claimed is:

1. A permanent magnet embedded rotor for a rotating electric machine, the rotor comprising:
   a rotor core having a pair of accommodating recesses adjacently located with a bridge portion arranged between the accommodating recesses; and
   a pair of permanent magnets accommodated in the corresponding accommodating recesses, the permanent magnets each having a magnetic pole surface, a magnetic pole facing surface facing each of the magnetic pole surfaces, wherein
   the rotor core has a rotor outer circumferential surface as an outer circumferential surface,
   a d-axis and a q-axis defined by the rotor,
   each of the accommodating recesses has a magnet accommodating portion for accommodating the corresponding permanent magnet and a cavity at the q-axis side of the magnet accommodating portion,
   the cavities open in the rotor outer circumferential surface,
   the d-axis side of each of the cavities is formed by an outer cavity forming surface,
   a starting point of each of the outer cavity forming surfaces is located on the rotor outer circumferential surface,
   the outer cavity forming surfaces each intersect either the corresponding magnetic pole surface or an imaginary extended plane of the corresponding magnetic pole facing surface,
   the rotor outer circumferential surface includes a portion of an imaginary annular line,
   the starting points of the outer cavity forming surfaces are each located between the d-axis and an intersection point between the imaginary annular line and the corresponding imaginary extended plane,
   an endpoint of each of the outer cavity forming surfaces is located on the corresponding magnetic pole facing surface, and
   an end portion of each magnetic pole surface proximate to the q-axis is exposed to the corresponding cavity.

2. The rotor according to claim 1, wherein
   the magnetic pole facing surfaces each face the corresponding magnetic pole surface to form the accommodating recess, and
   an end point of each of the outer cavity forming surfaces is located on the imaginary extended plane of the corresponding one of the magnetic pole facing surfaces.

3. The rotor according to claim 1, wherein
   the magnetic pole facing surfaces each face the corresponding magnetic pole surface to form the accommodating recess, and
   an end point of each of the outer cavity forming surfaces is located on the corresponding one of the magnetic pole facing surfaces.

4. The rotor according to claim 1, wherein
   the magnetic pole facing surfaces each face the corresponding magnetic pole surface to form the accommodating recess,
   the permanent magnets each include an opposite magnetic pole surface at the opposite side to the associated magnetic pole surface,
   the accommodating recesses are each formed by an opposite magnetic pole facing surface facing the corresponding opposite magnetic pole surface,
   the magnet accommodating portions each have a positioning surface perpendicular to the associated opposite magnetic pole facing surface at the q-axis side, and
   an end point of each of the outer cavity forming surfaces is located at the position where the corresponding magnetic pole facing surface and an imaginary extended plane of the positioning surface intersect each other.

5. The rotor according to claim 1, wherein
   the q-axis side of each of the cavities is formed by an inner cavity forming surface, a starting point of each of the inner cavity forming surfaces is located on the rotor outer circumferential surface,
   the permanent magnets each have an opposite magnetic pole surface at the opposite side to the associated magnetic pole surface,
   the accommodating recesses are each partly formed by the corresponding opposite magnetic pole facing surface facing the opposite magnetic pole surface, and
   the starting point of each of the inner cavity forming surfaces is located between the starting points of the outer cavity forming surfaces and an intersection point between an imaginary extended plane of the corresponding one of the opposite magnetic pole facing surfaces and the imaginary annular line.

6. The rotor according to claim 1, wherein
   the q-axis side of each of the cavities is formed by an inner cavity forming surface, the permanent magnets each include an opposite magnetic pole surface at the opposite side to the associated magnetic pole surface, the accommodating recesses are each partly formed by an opposite magnetic pole facing surface facing the opposite magnetic pole surface, the q-axis side of each of the magnet accommodating portions is formed by a positioning surface intersecting the associated opposite magnetic pole facing surface, a starting point of each of the inner cavity forming surfaces is located on the rotor outer circumferential surface, and an end point of each inner cavity forming surface is located at an end of the corresponding positioning surface.

7. The rotor according to claim 1, wherein the pair of the accommodating recesses are arranged in a V shape with the bridge portion located between the accommodating recesses.

8. A rotating electric machine comprising the rotor according to claim 1.

9. A permanent magnet embedded rotor for a rotating electric machine, the rotor comprising:
- a rotor core having a pair of accommodating recesses adjacently located with a bridge portion arranged between the accommodating recesses; and
- a pair of permanent magnets accommodated in the corresponding accommodating recesses, the permanent magnets each having a magnetic pole surface, a magnetic pole facing surface facing each of the magnetic pole surfaces, wherein the rotor core has a rotor outer circumferential surface as an outer circumferential surface, a d-axis and a q-axis defined by the rotor, each of the accommodating recesses has a magnet accommodating portion for accommodating the corresponding permanent magnet and a cavity at the q-axis side of the magnet accommodating portion, the cavities open in the rotor outer circumferential surface, the d-axis side of each of the cavities is formed by an outer cavity forming surface, a starting point of each of the outer cavity forming surfaces is located on the rotor outer circumferential surface, the outer cavity forming surfaces each intersect the corresponding magnetic pole surface, the rotor outer circumferential surface includes a portion of an imaginary annular line, the starting points of the outer cavity forming surfaces are each located between the d-axis and an intersection point between the imaginary annular line and the corresponding imaginary extended plane, an endpoint of each of the outer cavity forming surfaces is located on the corresponding magnetic pole facing surface, and an end portion of each magnetic pole surface proximate to the q-axis is exposed to the corresponding cavity.

10. A permanent magnet embedded rotor for a rotating electric machine, the rotor comprising:
- a rotor core having a pair of accommodating recesses adjacently located with a bridge portion arranged between the accommodating recesses; and
- a pair of permanent magnets accommodated in the corresponding accommodating recesses, the permanent magnets each having a magnetic pole surface, a magnetic pole facing surface facing each of the magnetic pole surfaces, wherein the rotor core has a rotor outer circumferential surface as an outer circumferential surface, a d-axis and a q-axis defined by the rotor, each of the accommodating recesses has a magnet accommodating portion for accommodating the corresponding permanent magnet and a cavity at the q-axis side of the magnet accommodating portion, the cavities open in the rotor outer circumferential surface, the d-axis side of each of the cavities is formed by an outer cavity forming surface, a starting point of each of the outer cavity forming surfaces is located on the rotor outer circumferential surface, the outer cavity forming surfaces each intersect an imaginary extended plane of the corresponding magnetic pole facing surface, the rotor outer circumferential surface includes a portion of an imaginary annular line, the starting points of the outer cavity forming surfaces are each located between the d-axis and an intersection point between the imaginary annular line and the corresponding imaginary extended plane, an endpoint of each of the outer cavity forming surfaces is located on the corresponding magnetic pole facing surface, and an end portion of each magnetic pole surface proximate to the q-axis is exposed to the corresponding cavity.

* * * * *